US012391855B2

(12) United States Patent
Tsushima et al.

(10) Patent No.: US 12,391,855 B2
(45) Date of Patent: Aug. 19, 2025

(54) URETHANE ADHESIVE COMPOSITION

(71) Applicant: SIKA TECHNOLOGY AG, Baar (CH)

(72) Inventors: Daisuke Tsushima, Kanagawa (JP); Kazunori Ishikawa, Kanagawa (JP)

(73) Assignee: SIKA TECHNOLOGY AG, Baar (CH)

( * ) Notice: Subject to any disclaimer, the term of this patent is extended or adjusted under 35 U.S.C. 154(b) by 484 days.

(21) Appl. No.: 18/011,096

(22) PCT Filed: May 24, 2021

(86) PCT No.: PCT/JP2021/019628
§ 371 (c)(1),
(2) Date: Dec. 16, 2022

(87) PCT Pub. No.: WO2021/256180
PCT Pub. Date: Dec. 23, 2021

(65) Prior Publication Data
US 2023/0250325 A1   Aug. 10, 2023

(30) Foreign Application Priority Data

Jun. 18, 2020   (JP) .................................. 2020-105458

(51) Int. Cl.
| | |
|---|---|
| *C09J 175/08* | (2006.01) |
| *C08G 18/10* | (2006.01) |
| *C08G 18/12* | (2006.01) |
| *C08G 18/48* | (2006.01) |
| *C08G 18/66* | (2006.01) |
| *C08K 3/26* | (2006.01) |
| *C08K 3/34* | (2006.01) |
| *C08L 75/04* | (2006.01) |
| *C09J 11/08* | (2006.01) |
| *C09J 175/04* | (2006.01) |

(52) U.S. Cl.
CPC ............ *C09J 175/08* (2013.01); *C08G 18/10* (2013.01); *C08G 18/12* (2013.01); *C08G 18/4845* (2013.01); *C08G 18/6674* (2013.01); *C08G 18/6685* (2013.01); *C08K 3/346* (2013.01); *C08L 75/04* (2013.01); *C09J 11/08* (2013.01); *C09J 175/04* (2013.01); *C08K 2003/265* (2013.01)

(58) Field of Classification Search
CPC .... C08G 18/10; C08G 18/12; C08G 18/4845; C08G 18/6674; C08G 18/6685; C08K 3/346; C08K 2003/265; C08L 75/04; C09J 11/08; C09J 175/04; C09J 175/08
See application file for complete search history.

(56) References Cited

U.S. PATENT DOCUMENTS

| | | |
|---|---|---|
| 2009/0044907 A1 | 2/2009 | Tribelhorn et al. |
| 2019/0292300 A1 * | 9/2019 | Mori .................. C08G 18/2081 |

FOREIGN PATENT DOCUMENTS

| | | | |
|---|---|---|---|
| JP | 2010-534741 A | | 11/2010 |
| JP | 2011202018 A | * | 10/2011 |

OTHER PUBLICATIONS

English-language machine translation of JP 2011202018 A (Year: 2011).*

* cited by examiner

*Primary Examiner* — James C Goloboy
(74) *Attorney, Agent, or Firm* — Oliff PLC

(57) ABSTRACT

A two-part urethane adhesive composition includes a main agent containing a filler and a urethane prepolymer having an isocyanate group and formed from a polyisocyanate A and a polyol 1 with two to three hydroxy groups per molecule and a number-average molecular weight of ≥1800. Isocyanate group content in the main agent is ≥5 mass % of a main agent total content. The composition includes a curing agent containing a polyoxyalkylene polyol, a polyol 2, a urethanization reaction catalyst, a filler, and zeolite, the polyoxyalkylene polyol having two to three hydroxy groups per molecule and having a number-average molecular weight of ≥1800, the polyol 2 having two or more hydroxy groups per molecule and having a number-average molecular weight of ≤200. The urethanization reaction catalyst contains an organic tin catalyst, and an amine catalyst represented by Formula (1) or an amine catalyst blocked with an acid.

14 Claims, No Drawings

URETHANE ADHESIVE COMPOSITION

TECHNICAL FIELD

The present technology relates to a urethane adhesive composition.

BACKGROUND ART

Conventionally, a two-part urethane adhesive composition has been used as an adhesive, and for example, a two-part polyurethane described in Japan Unexamined Patent Publication No. 2010-534741 A has been proposed.

A two-part urethane adhesive composition is required to have high adhesion strength and a high elastic modulus. High adhesion strength and a high elastic modulus are achieved by having, at a high density, urethane bonds or urea bonds which form hard segments in a cured product.

However, when the amount of isocyanate groups in a main agent is large, air would be incorporated into a mixture system when the two liquids are mixed for instance, and due to moisture in the air, the isocyanate groups would react with water so that carbon dioxide is rapidly generated, and this may promote foaming in a resulting cured product.

Addition of a dehydrating agent or the like can be considered in order to prevent such foaming; however, when a dehydrating agent is used, it takes a longer period of time for high adhesion strength to develop.

In such circumstances, the present inventors prepared a urethane adhesive composition by reference to Japan Unexamined Patent Publication No. 2010-534741 A and evaluated the composition. The results thereof revealed that the adhesion slowly develops in such a composition in some cases.

SUMMARY

The present technology provides a urethane adhesive composition whose main agent has a high isocyanate group content and which allows excellent adhesion strength to rapidly develop even when a dehydrating agent is used, while foaming in a cured product is minimized.

The present inventors have found that by using an organic tin catalyst and a specific amine catalyst as a urethanization reaction catalyst and also using zeolite in combination therewith in a two-part urethane adhesive composition whose main agent has a high isocyanate group content, excellent adhesion strength can rapidly develop, while foaming in a cured product can be minimized.

The present technology is based on the above findings and the like, and specifically, provides the following characteristic features.

[1] A urethane adhesive composition being a two-part urethane adhesive composition comprising a main agent and a curing agent,
wherein the main agent contains a urethane prepolymer and a filler, the urethane prepolymer having an isocyanate group and being formed from a polyisocyanate A and a polyol 1 that has two to three hydroxy groups per molecule and has a number-average molecular weight of not less than 1800,
a content of isocyanate groups in the main agent is not less than 5 mass % of a total amount of the main agent,
the curing agent contains a polyoxyalkylene polyol, a polyol 2, a urethanization reaction catalyst, a filler, and zeolite, the polyoxyalkylene polyol having two to three hydroxy groups per molecule and having a number-average molecular weight of not less than 1800, the polyol 2 having two or more hydroxy groups per molecule and having a number-average molecular weight of not more than 200, and
the urethanization reaction catalyst contains an organic tin catalyst, and an amine catalyst represented by Formula (1) or a blocked amine catalyst in which the amine catalyst is blocked with an acid,

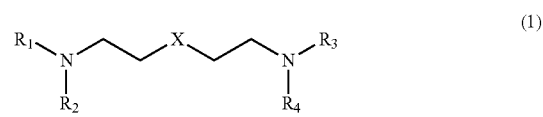

where X represents an oxygen atom, or a nitrogen atom to which one alkyl group is bonded, $R_1$ to $R_4$ each independently represent an alkyl group, the alkyl group may have an ether bond, $R_1$ and $R_2$ may be bonded together to form a cyclic structure, and $R_3$ and $R_4$ may be bonded together to form a cyclic structure.

[2] The urethane adhesive composition according to [1], wherein the main agent further contains a polyisocyanate B.

[3] The urethane adhesive composition according to [2], wherein the polyisocyanate A and the polyisocyanate B each independently include at least one selected from the group consisting of diphenylmethane diisocyanate, polymeric MDI, and modified MDI.

[4] The urethane adhesive composition according to any one of [1] to [3], wherein the urethane prepolymer further contains unreacted polyisocyanate A in the polyisocyanate A.

[5] The urethane adhesive composition according to any one of [1] to [4], wherein in the organic tin catalyst, a ligand coordinated to a tin atom has a sulfur atom as a coordinating atom coordinated to the tin atom.

[6] The urethane adhesive composition according to any one of [1] to [5], wherein the polyol 1 includes at least a polyol having three hydroxy groups per molecule and having a number-average molecular weight of not less than 4800.

[7] The urethane adhesive composition according to any one of [1] to [6], wherein the polyoxyalkylene polyol has three hydroxy groups per molecule and has a number-average molecular weight of not less than 4,800.

[8] The urethane adhesive composition according to any one of [1] to [7], wherein the polyol 2 has two hydroxy groups per molecule.

[9] The urethane adhesive composition according to any one of [1] to [8], wherein the polyol 2 is 1,4-butanediol.

[10] The urethane adhesive composition according to any one of [1] to [9], wherein a content of the zeolite is not less than 3 mass % of a total amount of the curing agent.

[11] The urethane adhesive composition according to any one of [1] to [10], wherein a ratio of the number of isocyanate reactive groups in the curing agent to the number of all isocyanate groups in the main agent is 0.6 to 1.0.

[12] The urethane adhesive composition according to any one of [1] to [11], wherein a content of the urethanization reaction catalyst is 0.001 to 1.0 mass % of a total amount of the curing agent.

[13] The urethane adhesive composition according to any one of [1] to [12], wherein an elastic modulus after full curing is not less than 15 MPa.

[14] The urethane adhesive composition according to any one of [1] to [13], wherein the curing agent further contains a polyamine.

In a urethane adhesive composition of the technology, a main agent has a high isocyanate group content, and excellent adhesion strength can rapidly develop even when a dehydrating agent is used, while foaming in a cured product can be minimized.

DESCRIPTION OF EMBODIMENTS

The present technology is described below in detail.

In the present description, a numerical range expressed in the form of "A to B" is intended to mean the range including the values A and B before and after "to" as the upper and lower limits of the range.

In the present description, for each component, substances corresponding to the component may be used singly or in combination of two or more, unless otherwise specified. When a certain component comprises two or more substances, the content of the component is intended to mean the total content of the two or more substances.

In the present description, at least one of the performance of allowing excellent adhesion strength to rapidly develop (also called "adhesion development performance") and the performance of minimizing foaming in a cured product (also called "foaming minimizing performance") being more excellent is sometimes referred to as "a more excellent effect of the technology."

In the present description, the term "meth(acryl)" refers to "acryl" or "methacryl."

[Urethane Adhesive Composition]

A urethane adhesive composition of the technology (a composition of the technology) is a two-part urethane adhesive composition comprising a main agent and a curing agent, wherein the main agent contains a urethane prepolymer and a filler, the urethane prepolymer having an isocyanate group and being formed from a polyisocyanate A and a polyol 1 that has two to three hydroxy groups per molecule and has a number-average molecular weight of not less than 1800, a content of isocyanate groups in the main agent is not less than 5 mass % of a total amount of the main agent, the curing agent contains a polyoxyalkylene polyol, a polyol 2, a urethanization reaction catalyst, a filler, and zeolite, the polyoxyalkylene polyol having two to three hydroxy groups per molecule and having a number-average molecular weight of not less than 1800, the polyol 2 having two or more hydroxy groups per molecule and having a number-average molecular weight of not more than 200, and the urethanization reaction catalyst contains an organic tin catalyst, and an amine catalyst represented by Formula (1) or a blocked amine catalyst in which the amine catalyst is blocked with an acid.

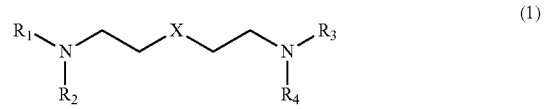

In Formula (1), X represents an oxygen atom, or a nitrogen atom to which one alkyl group is bonded, $R_1$ to $R_4$ each independently represent an alkyl group, the alkyl group may have an ether bond, $R_1$ and $R_2$ may be bonded together to form a cyclic structure, and $R_3$ and $R_4$ may be bonded together to form a cyclic structure.

In the present description, the amine catalyst represented by Formula (1) above or the blocked amine catalyst in which that amine catalyst is blocked with an acid is sometimes collectively called "specific amine catalyst."

Desired effects can be obtained probably because the composition of the technology has the foregoing structure. The reason thereof is not clear but is assumed as follows:

In the present technology, the organic tin catalyst is used for a reaction between isocyanate groups that the urethane prepolymer has and hydroxy groups that the polyoxyalkylene polyol and the polyol 2 have, whereby the adhesion in the initial stage of mixing of the two liquids can rapidly develop.

In addition, zeolite is used for a reaction between the isocyanate groups and water, whereby it is possible to minimize rapid generation of carbon dioxide caused by the reaction between the isocyanate groups and water in the initial stage of mixing of the two liquids.

Furthermore, the present inventors assume that the specific amine catalyst accelerates a reaction between the isocyanate groups and water after the initial stage, so that adhesion strength resulting from that reaction is allowed to develop after development of adhesion strength resulting from the reaction between the isocyanate groups and the hydroxy groups that the polyoxyalkylene polyol and another component have, with a time difference. Moreover, the present inventors consider that the specific amine catalyst is advantageous in that it is possible to minimize foaming caused by a reaction between isocyanate and water despite that the specific amine catalyst has high activity with respect to a reaction between an isocyanate group and water as described above.

Thus, it is assumed that, in the present technology, owing to the use of the urethanization reaction catalyst containing both the organic tin catalyst and the specific amine catalyst and also zeolite in combination therewith for the two-part urethane adhesive composition whose main agent has a high isocyanate group content, excellent adhesion strength can develop rapidly and in stages with a time difference upon different reactions as above, while foaming in a cured product can be minimized.

The foregoing mechanism is what the present inventors assume, and the mechanism of the technology is not limited thereto.

The components contained in the composition of the technology is described below in detail.

«Main Agent»

The main agent that the urethane adhesive composition of the technology has includes:

a urethane prepolymer having an isocyanate group and being formed from a polyisocyanate A and a polyol 1 that has two to three hydroxy groups per molecule and has a number-average molecular weight of not less than 1800; and a filler.

<Urethane Prepolymer>

In the present technology, the urethane prepolymer contained in the main agent is a urethane prepolymer having an isocyanate group and being formed from a polyisocyanate A and a polyol 1 that has two to three hydroxy groups per molecule and has a number-average molecular weight of not less than 1800.

The main agent that the composition of the technology has contains the above urethane prepolymer as an isocyanate component having an isocyanate group.

<Polyisocyanate A>

The polyisocyanate A that is a constituent of the urethane prepolymer is not particularly limited as long as it has two or more isocyanate groups per molecule.

Examples of the polyisocyanate A include: aromatic polyisocyanates such as tolylene diisocyanate (TDI), diphenylmethane diisocyanate (unsubstituted MDI; also called pure MDI or monomeric MDI), 1,4-phenylene diisocyanate, polymethylene polyphenylene polyisocyanate, xylylene diisocyanate (XDI), tetramethyl xylylene diisocyanate (TMXDI), tolidine diisocyanate (TODI), 1,5-naphthalene diisocyanate (NDI), triphenylmethane triisocyanate, polymeric MDI (a compound obtained by polymerizing diphenylmethane diisocyanate (pure MDI)), and modified MDIs (e.g., isocyanurate-modified MDI (a trimer of MDI), carbodiimide-modified MDI, urethane-modified MDI, and the like obtained by modifying diphenylmethane diisocyanate (pure MDI)); and aliphatic and/or alicyclic polyisocyanates such as hexamethylene diisocyanate (HDI), trimethyl hexamethylene diisocyanate (TMHDI), lysine diisocyanate, norbornane diisocyanate (NBDI), trans-cyclohexane-1,4-diisocyanate, isophorone diisocyanate (IPDI), bis(isocyanatomethyl)cyclohexane ($H_6XDI$), dicyclohexylmethane diisocyanate ($H_{12}MDI$), carbodiimide modifications thereof, and isocyanurate modifications thereof.

It should be noted that the polymeric MDI is not included in the modified MDIs.

The polyisocyanate A used in formation of the urethane prepolymer is preferably aromatic polyisocyanate, more preferably includes at least one selected from the group consisting of diphenylmethane diisocyanate (pure MDI), polymeric MDI, and modified MDI, and even more preferably includes diphenylmethane diisocyanate (pure MDI) or modified MDI, because this leads to a more excellent effect of the technology.

<Polyol 1>

The polyol 1 that is a constituent of the urethane prepolymer is a polyol having two to three hydroxy groups per molecule and having a number-average molecular weight of not less than 1800.

(Hydroxy Group)

In the present technology, the polyol 1 has two to three hydroxy groups per molecule. The number of hydroxy groups that the polyol 1 has per molecule is preferably three because this leads to a more excellent effect of the technology.

(Number-Average Molecular Weight)

In the present technology, the number-average molecular weight of the polyol 1 is not less than 1800. The number-average molecular weight of the polyol 1 is preferably not less than 4800 because this leads to a more excellent effect of the technology. The number-average molecular weight of the polyol 1 is preferably not more than 20000.

In the present technology, for the weight-average molecular weight of the polyol 1, there may be used a standard polystyrene equivalent value obtained by gel permeation chromatography (GPC) measurement with the following conditions.

Solvent: Tetrahydrofuran

Detector: RI detector

Further, the polyol 1 preferably includes a polyol having a number-average molecular weight of not less than 4800 because this leads to a more excellent effect of the technology.

The number-average molecular weights of the polyoxyalkylene polyol and the polyol 2, which will be described later, may also be measured by the same method as above.

Examples of the polyol 1 include polyether polyol, polyester polyol, and poly(meth)acryl polyol. In particular, one favorable embodiment is the polyol 1 being polyether polyol.

Exemplary polyether polyols include polyoxyethylene diol (polyethylene glycol), polyoxypropylene diol (polypropylene glycol: PPG), polyoxypropylene triol, diol of ethylene oxide/propylene oxide copolymer, and triol of ethylene oxide/propylene oxide copolymer. In particular, one favorable embodiment is the polyol 1 including polyoxypropylene triol.

The polyol 1 preferably includes at least a polyol having three hydroxy groups per molecule and having a number-average molecular weight of not less than 4800 and preferably includes only a polyol having three hydroxy groups per molecule and having a number-average molecular weight of not less than 4800 because this leads to a more excellent effect of the technology.

Urethane Prepolymer Manufacturing Method

The method of manufacturing the urethane prepolymer is not particularly limited. For instance, the polyisocyanate A is used such that the amount of isocyanate groups is 1.5 to 25.0 moles with respect to 1 mole of hydroxy groups that the polyol 1 has, and these are mixed and reacted under the condition of 60° C. to 100° C. for example, whereby the urethane prepolymer can be manufactured. A plasticizer may be used in manufacture of the urethane prepolymer.

In the present technology, it is assumed that the amounts of the polyol 1 and the polyisocyanate A used in the urethane prepolymer manufacturing method can be reflected on the amount of the resulting urethane prepolymer (which may contain unreacted polyisocyanate A).

In the present technology, the urethane prepolymer has an isocyanate group.

The urethane prepolymer may further contain unreacted polyisocyanate A in the polyisocyanate A used in manufacture of the uretane prepolymer for the reason that the isocyanate group content of the main agent can be increased. In this case, the main agent that the composition of the technology has contains an unreacted polyisocyanate A-containing urethane prepolymer as the isocyanate component having an isocyanate group.

The isocyanate group content of the urethane prepolymer (including the case that unreacted polyisocyanate A is further contained) is preferably 8 to 20 mass % of the total amount of the urethane prepolymer because this leads to a more excellent effect of the technology.

The isocyanate group content of the urethane prepolymer (including the case that unreacted polyisocyanate A is further contained) can be measured with a potentiometric titrator by the A method according to JIS K-1603-1:2007.

The same method can also be used in measurement of the isocyanate group content of polyisocyanate B to be described below.

(Polyisocyanate B)

The main agent preferably further contains polyisocyanate B because the isocyanate group content of the main agent can be increased and this leads to a more excellent effect of the technology.

The polyisocyanate B is not particularly limited as long as it has two or more isocyanate groups per molecule.

It should be noted that the above-described urethane prepolymer does not include the polyisocyanate B.

When the main agent further contains the polyisocyanate B, the main agent contains, in addition to the urethane prepolymer, the polyisocyanate B as the isocyanate component having an isocyanate group.

Further, when the main agent further contains the polyisocyanate B, the polyisocyanate B may be added to the urethane prepolymer.

Specific examples of the polyisocyanate B may be the same as those listed as examples of the polyisocyanate A that is a constituent of the urethane prepolymer, for instance.

The polyisocyanate B is preferably aromatic polyisocyanate, more preferably includes at least one selected from the group consisting of diphenylmethane diisocyanate (pure MDI), polymeric MDI, and modified MDI, and even more preferably includes a carbodiimide modification of diphenylmethane diisocyanate, because this leads to a more excellent effect of the technology.

The polyisocyanate A and the polyisocyanate B to be used may be the same or different.

When the polyisocyanate A is diphenylmethane diisocyanate (pure MDI), the polyisocyanate B is preferably modified MDI and more preferably a carbodiimide modification of diphenylmethane diisocyanate because this leads to a more excellent effect of the technology.

The polyisocyanate B content is preferably 70 to 100 parts by mass based on 100 parts by mass of the urethane prepolymer (which may contain unreacted polyisocyanate A; hereinafter the same applies for the definition of "100 parts by mass of the urethane prepolymer").

<Filler>

In the present technology, the main agent contains a filler. The filler contained in the main agent is not particularly limited.

In the present technology, the filler contained in the main agent does not include zeolite to be described later.

Examples of the filler contained in the main agent include carbon black, calcium carbonate, clay, silica, and talc. The filler may be surface-treated with a surface treating agent such as a fatty acid, a resin acid, a urethane compound, and a fatty acid ester.

The filler contained in the main agent is preferably carbon black because this leads to a more excellent effect of the technology. Carbon black is not particularly limited. For instance, conventionally known ones are usable.

Filler Content of the Main Agent

The filler content of the main agent is preferably 10 to 100 parts by mass and more preferably 15 to 70 parts by mass based on 100 parts by mass of the urethane prepolymer because this leads to a more excellent effect of the technology.

(Plasticizer)

The main agent may further contain a plasticizer.

Examples of the plasticizer include: diisononyl phthalate (DINP); dioctyl adipate, isodecyl succinate; diethylene glycol dibenzoate, pentaerythritol ester; butyl oleate, methyl acetyl ricinolate; tricresyl phosphate, trioctyl phosphate; adipic acid-propylene glycol polyester, and adipic acid-butylene glycol polyester.

The plasticizer that the main agent may further contain may include a substance derived from a plasticizer that can be used in manufacture of the urethane prepolymer.

One favorable embodiment is the plasticizer having no isocyanate group.

The plasticizer content is preferably 0 to 70 parts by mass and more preferably 10 to 70 parts by mass based on 100 parts by mass of the urethane prepolymer because this leads to a more excellent effect of the technology.

Preparation of the Main Agent

The main agent can be prepared by mixing the foregoing essential components and optionally usable components, e.g., the polyisocyanate B and the plasticizer, while replacing gas in the system by, for example, nitrogen gas to prevent those components from contacting water such as moisture.

<Isocyanate Group Content Based on the Total Amount of the Main Agent>

In the present technology, the isocyanate group content of the main agent is not less than 5 mass % of the total amount of the main agent.

Owing to the isocyanate group content based on the total amount of the main agent being not less than 5 mass % of the total amount of the main agent, the resulting cured product can have high adhesion strength and a high elastic modulus.

In the present technology, the isocyanate group content of the main agent includes the amount of isocyanate groups that the urethane prepolymer has.

It should be noted that when the urethane prepolymer further contains unreacted polyisocyanate A as described above, the amount of isocyanate groups that the urethane prepolymer has includes the amount of isocyanate groups that the unreacted polyisocyanate A has.

When the main agent further contains the polyisocyanate B as described above, the isocyanate group content of the main agent includes, in addition to the amount of isocyanate groups that the urethane prepolymer has, the amount of isocyanate groups that the polyisocyanate B has.

The main agent contains the urethane prepolymer as the isocyanate component having an isocyanate group. Further, the main agent may optionally contain unreacted polyisocyanate A that may be contained in the urethane prepolymer, and/or the polyisocyanate B. The unreacted polyisocyanate A and the polyisocyanate B correspond to the isocyanate component having an isocyanate group.

Thus, in the present technology, "a content of isocyanate groups in the main agent is not less than 5 mass % of a total amount of the main agent" can be rephrased into "the amount of all isocyanate groups of the isocyanate component having an isocyanate group is not less than 5 mass % of the total amount of the main agent."

The isocyanate group content of the main agent is preferably 6 to 20 mass % and more preferably 8 to 20 mass % of the total amount of the main agent because this leads to a more excellent effect of the technology.

Method of Calculating the Isocyanate Group Content of the Main Agent (i.e., Based on the Total Amount of the Main Agent)

The isocyanate group content (mass %) of the main agent can be calculated, for instance, in the following manner:

first, the isocyanate group content percentage (mass %) of the isocyanate component is measured with a potentiometric titrator by the A method according to JIS K-1603-1:2007; next, the amount of isocyanate groups in the isocyanate component is derived from the measurement result and the isocyanate component content of the main agent; and finally, the amount of isocyanate groups in the isocyanate component as obtained above is divided by the total amount of the main agent (the sum of the amounts of contained urethane prepolymer, filler, and other components) and then multiplied by 100.

In the above measurement of the isocyanate group content percentage of the isocyanate component, the isocyanate component includes at least the urethane prepolymer. The urethane prepolymer may contain unreacted polyisocyanate A (hereinafter the same).

The isocyanate component may be in the state that it contains the plasticizer (e.g., a plasticizer used in manufacture of the urethane prepolymer) (hereinafter the same).

When the main agent further contains the polyisocyanate B, the isocyanate group content percentage of the isocyanate component in the state of, for instance, a mixture of the urethane prepolymer and the polyisocyanate B can be measured by the above method.

Method of Calculating the Isocyanate Group Content of the Main Agent (i.e., Based on the Total Amount of the Main Agent) When the Isocyanate Component is the Urethane Prepolymer (NCO Amount Calculation Method I)

When the isocyanate component is the urethane prepolymer, the urethane prepolymer may contain unreacted polyisocyanate A, and the isocyanate component is a mixture of the urethane prepolymer and the plasticizer, the isocyanate group content (mass %) of the main agent can be calculated in the following manner: the isocyanate group content percentage of the mixture is measured by the above method; next, the amount of isocyanate groups in the mixture is derived from the measurement result and the mixture content; and finally, the amount of isocyanate groups in the mixture as obtained above is divided by the total amount of the main agent (the sum of the amounts of contained urethane prepolymer, filler, and other components) and then multiplied by 100. The method of calculating the isocyanate group content based on the total amount of the main agent as described above is hereinafter called "NCO amount calculation method I."

Method of Calculating the Isocyanate Group Content of the Main Agent (i.e., Based on the Total Amount of the Main Agent) When the Isocyanate Component is the Urethane Prepolymer and the Polyisocyanate B (NCO Amount Calculation Method II)

When the isocyanate component is the urethane prepolymer and the polyisocyanate B, the urethane prepolymer may contain unreacted polyisocyanate A, and the isocyanate component is a mixture of the urethane prepolymer, the polyisocyanate B, and the plasticizer, the isocyanate group content (mass %) of the main agent can be calculated in the following manner: the isocyanate group content percentage of the mixture is measured by the above method; next, the amount of isocyanate groups in the mixture is derived from the measurement result and the mixture content; and finally, the amount of isocyanate groups in the mixture as obtained above is divided by the total amount of the main agent (the sum of the amounts of contained urethane prepolymer, filler, and other components) and then multiplied by 100. The method of calculating the isocyanate group content based on the total amount of the main agent as described above is hereinafter called "NCO amount calculation method II."

(Isocyanate Component Content Percentage of the Main Agent)

The isocyanate component content percentage (mass %) of the main agent is preferably 50 to 90 mass % and more preferably 55 to 85 mass % of the main agent because this leads to a more excellent effect of the technology.

The isocyanate component includes at least the urethane prepolymer. The urethane prepolymer may contain unreacted polyisocyanate A. When the main agent further contains the polyisocyanate B, the isocyanate component includes the urethane prepolymer and the polyisocyanate B.

The isocyanate component content percentage of the main agent above refers to the content percentage of only the isocyanate component in the main agent. The isocyanate component content percentage of the main agent above does not include the amount of the plasticizer.

《Curing Agent》

The curing agent that the urethane adhesive composition of the technology has includes:
- a polyoxyalkylene polyol having two to three hydroxy groups per molecule and having a number-average molecular weight of not less than 1800;
- a polyol 2 having two or more hydroxy groups per molecule and having a number-average molecular weight of not more than 200;
- a urethanization reaction catalyst;
- a filler; and
- zeolite.

In the present technology, the urethanization reaction catalyst contains an organic tin catalyst, and an amine catalyst represented by Formula (1) or a blocked amine catalyst in which the amine catalyst is blocked with an acid, which will be described later.

<Polyoxyalkylene Polyol>

In the present technology, the polyoxyalkylene polyol contained in the curing agent is a polyoxyalkylene polyol having two to three hydroxy groups per molecule and having a number-average molecular weight of not less than 1800.

The polyoxyalkylene polyol can react with the isocyanate component in the main agent.

The polyoxyalkylene polyol has a hydroxy group as a group reactable with an isocyanate group that the isocyanate component has (which reactable group is also called "isocyanate reactive group"; hereinafter the same).

(Hydroxy Group)

In the present technology, the polyoxyalkylene polyol has two to three hydroxy groups per molecule. The number of hydroxy groups that the polyoxyalkylene polyol has per molecule is preferably three because this leads to a more excellent effect of the technology.

(Number-Average Molecular Weight)

In the present technology, the number-average molecular weight of the polyoxyalkylene polyol is not less than 1800. The number-average molecular weight of the polyoxyalkylene polyol is preferably not less than 4800 because this leads to a more excellent effect of the technology. The number-average molecular weight of the polyoxyalkylene polyol is preferably not more than 20000.

Examples of the polyoxyalkylene polyol include polyoxyethylene diol (polyethylene glycol), polyoxypropylene diol (polypropylene glycol: PPG), polyoxypropylene triol, diol of ethylene oxide/propylene oxide copolymer, and triol of ethylene oxide/propylene oxide copolymer.

It is preferable for the polyoxyalkylene polyol to have three hydroxy groups per molecule and have a number-average molecular weight of not less than 4800 because this leads to a more excellent effect of the technology.

Polyoxyalkylene Polyol Content

The polyoxyalkylene polyol content is preferably 70 to 95 mass % of the total amount of all isocyanate reactive group-containing compounds contained in the curing agent because this leads to a more excellent effect of the technology.

The polyoxyalkylene polyol and the polyol 2 to be described later correspond to the isocyanate reactive group-containing compounds. When the curing agent further contains a polyamine to be described later, the polyamine corresponds to the isocyanate reactive group-containing compound.

<Polyol 2>

In the present technology, the polyol 2 contained in the curing agent is a polyol having two or more hydroxy groups per molecule and having a number-average molecular weight of not more than 200.

The polyol 2 can react with the isocyanate component in the main agent.

The polyol 2 has a hydroxy group as the isocyanate reactive group.

(Hydroxy Group)

In the present technology, the polyol 2 has two or more hydroxy groups per molecule. The number of hydroxy groups that the polyol 2 has per molecule is preferably two because this leads to a more excellent effect of the technology.

(Number-Average Molecular Weight)

In the present technology, the number-average molecular weight of the polyol 2 is not more than 200. The number-average molecular weight of the polyol 2 is preferably 50 to 150 because this leads to a more excellent effect of the technology.

Examples of the polyol 2 include an alcohol having plural hydroxy groups and a saturated hydrocarbon group with 1 to 10 carbon atoms. Specific examples thereof include butanediol and hexanediol.

The polyol 2 is preferably 1,4-butanediol because this leads to a more excellent effect of the technology.

Polyol 2 Content

The polyol 2 content is preferably 4 to 25 mass % of the total amount of all isocyanate reactive group-containing compounds contained in the curing agent because this leads to a more excellent effect of the technology.

The curing agent preferably contains a polyamine because this leads to a more excellent effect of the technology.

The polyamine is not particularly limited as long as it is a compound having an amino group (—NH$_2$) and/or an imino group (—NH—), with the total number of those groups being two or more per molecule.

The polyamine has an amino group (—NH$_2$) and/or an imino group (—NH—) as the isocyanate reactive group.

It should be noted that the polyamine does not include the amine catalyst represented by Formula (1), which is described later, contained in the urethanization reaction catalyst.

Examples of the polyamine include: aliphatic polyamines such as diethylenetriamine, diethylaminopropylamine, and triethylenetetramine;
  aromatic polyamines such as diaminodiphenylmethane, diaminodiphenylsulfone, and benzidine; and
  polyether polyamine (polyamine whose main chain is polyether).

For the polyamine, of these, polyether polyamine is preferred, and polyoxypropylenediamine is more preferred.

One favorable embodiment of polyoxypropylenediamine is a compound in which each end of polyoxypropylene is bonded to one amino group.

Polyamine Content

When the curing agent further contains the polyamine, the polyamine content is preferably 1.0 to 8.0 mass % of the total amount of all isocyanate reactive group-containing compounds contained in the curing agent because this leads to a more excellent effect of the technology.

<Urethanization Reaction Catalyst>

In the present technology, the urethanization reaction catalyst contained in the curing agent includes an organic tin catalyst, and an amine catalyst represented by Formula (1) or a blocked amine catalyst in which the amine catalyst is blocked with an acid.

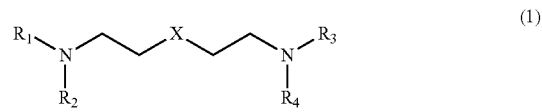

In Formula (1), X represents an oxygen atom, or a nitrogen atom to which one alkyl group is bonded, $R_1$ to $R_4$ each independently represent an alkyl group, the alkyl group may have an ether bond, $R_1$ and $R_2$ may be bonded together to form a cyclic structure, and $R_3$ and $R_4$ may be bonded together to form a cyclic structure.

The amine catalyst represented by Formula (1) and the blocked amine catalyst in which that amine catalyst is blocked with an acid are sometimes collectively called "specific amine catalyst."

<Organic Tin Catalyst>

In the present technology, the curing agent contains an organic tin catalyst as the urethanization reaction catalyst.

In the present technology, owing to the use of the organic tin catalyst for a reaction between isocyanate groups that the isocyanate component has and hydroxy groups that the polyoxyalkylene polyol and the polyol 2 have, the adhesion in the initial stage of mixing of the two liquids can rapidly develop.

Examples of the organic tin catalyst include: dialkyltin dicarboxylates such as dibutyltin dilaurate, dibutyltin diacetate, dibutyltin diethylhexanoate, dibutyltin dioctate, dibutyltin dimethyl malate, dibutyltin diethyl malate, dibutyltin dibutyl malate, dibutyltin diisooctyl malate, dibutyltin ditridecyl malate, dibutyltin dibenzyl malate, dibutyltin maleate, dioctyltin diacetate, dioctyltin distearate, dioctyltin dilaurate, dioctyltin diethyl malate, and dioctyltin diisooctyl malate;
  dialkyltin dialkoxides;
  divalent tin compounds such as tin octylate, tin naphthenate, tin stearate, and tin versatates;
  dialkyltin dialkyl mercaptides; and
  dialkyltin bis(thioglycollates).

When the organic tin catalyst has an alkyl group directly bonded to tin (e.g., dialkyltin dicarboxylates, and dialkyltin bis(thioglycollates)), the number of carbon atoms of the alkyl group is preferably 6 or more and more preferably 8 to 12.

In the organic tin catalyst, a ligand coordinated to a tin atom preferably has a sulfur atom as a coordinating atom coordinated to the tin atom because this leads to a more excellent effect of the technology.

Examples of a compound having a sulfur atom as a coordinating atom in the organic tin catalyst include dialkyltin dialkyl mercaptides and dialkyltin bis(thioglycollates).

One example of dialkyltin dialkyl mercaptides is for example a compound represented by Formula (2).

In Formula (2), $R_{21}$ and $R_{22}$ each independently represent an alkyl group. Two $R_{21}$'s may be the same or different. The same applies to $R_{22}$. The alkyl group is not particularly limited.

Specific examples of dialkyltin dialkyl mercaptides include dibutyltin dioctyl mercaptide, dioctyltin dioctyl mercaptide, dibutyltin didodecyl captide, and dioctyltin didodecyl mercaptide.

One example of dialkyltin bis(thioglycollates) is for example a compound represented by Formula (3).

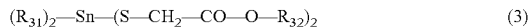

In Formula (3), $R_{31}$ and $R_{32}$ each independently represent an alkyl group. Two $R_{31}$'s may be the same or different. The same applies to $R_{32}$. The alkyl group is not particularly limited.

Specific examples of dialkyltin bis(thioglycollates) include dibutyltin bis(octyl thioglycollate), and dioctyltin bis(octyl thioglycollate).

The organic tin catalyst is preferably an organic tin catalyst in which a ligand coordinated to a tin atom has a sulfur atom as a coordinating atom coordinated to the tin atom, more preferably one of dialkyltin dialkyl mercaptides and/or dialkyltin bis(thioglycollates), still more preferably one of dialkyltin bis(thioglycollates), and even more preferably dioctyltin bis(octyl thioglycollate), because this leads to a more excellent effect of the technology.

<Specific Amine Catalyst>

In the present technology, the curing agent contains the specific amine catalyst as the urethanization reaction catalyst.

In the present technology, the specific amine catalyst is an amine catalyst represented by Formula (1) below or a blocked amine catalyst in which the amine catalyst is blocked with an acid.

In the present technology, the use of the specific amine catalyst can accelerate a reaction between isocyanate and water, while minimizing foaming caused by a reaction between isocyanate and water.

(Amine Catalyst Represented by Formula (1))

Formula (1) is as follows.

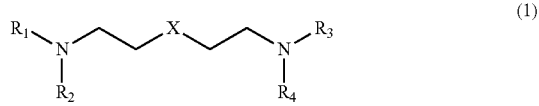

In Formula (1), X represents an oxygen atom, or a nitrogen atom to which one alkyl group is bonded, $R_1$ to $R_4$ each independently represent an alkyl group, the alkyl group may have an ether bond, $R_1$ and $R_2$ may be bonded together to form a cyclic structure, and $R_3$ and $R_4$ may be bonded together to form a cyclic structure.

X

X in Formula (1) represents "an oxygen atom" or "a nitrogen atom to which one alkyl group is bonded."

The foregoing nitrogen atom to which one alkyl group is bonded, represented by X, can be denoted by —NR—, where R represents an alkyl group. The alkyl group as R is not particularly limited.

X is preferably an oxygen atom because this leads to a more excellent effect of the technology.

$R_1$ to $R_4$

In Formula (1), $R_1$ to $R_4$ each independently represent an alkyl group.

The alkyl group as $R_1$ to $R_4$ may have an ether bond.

$R_1$ and $R_2$ may be bonded together to form a cyclic structure. $R_3$ and $R_4$ may be bonded together to form a cyclic structure.

$R_1$ and $R_2$ may be bonded together to form a cyclic structure, and the cyclic structure may have an ether bond. One example of the cyclic structure formed by bonding of $R_1$ and $R_2$ and also having an ether bond is a cyclic structure of a morpholine skeleton. For the case where $R_3$ and $R_4$ are bonded together to form a cyclic structure, it is also the same as the case where $R_1$ and $R_2$ are bonded together to form a cyclic structure. The cyclic structure of a morpholine skeleton may have a hydrocarbon group as a substituent.

It is preferable that $R_1$ to $R_4$ each independently represent a monovalent group. In this case, $R_1$ and $R_2$ are not bonded together to form a cyclic structure. The same applies to $R_3$ and $R_4$.

The amine catalyst represented by Formula (1) preferably contains bis(N,N-dialkyl-2-aminoethyl)ether and more preferably contains bis(N,N-dimethyl-2-aminoethyl)ether because this leads to a more excellent effect of the technology.

(Blocked Amine Catalyst)

In the present technology, the blocked amine catalyst is a blocked amine catalyst in which the above amine catalyst represented by Formula (1) is blocked with an acid.

The amine catalyst represented by Formula (1) being blocked with an acid means that at least one of two nitrogen atoms in Formula (1) forms a salt with an acid.

Amine Catalyst Being a Constituent of the Blocked Amine Catalyst

The amine catalyst represented by Formula (1), which is a constituent of the blocked amine catalyst, is the same as the amine catalyst described above.

Acid Being a Constituent of the Blocked Amine Catalyst

The acid being a constituent of the blocked amine catalyst is not particularly limited. Examples thereof include hydrochloric acid, sulfuric acid, carboxylic acid, and phenols.

The acid is preferably carboxylic acid because this leads to a more excellent effect of the technology.

The carboxylic acid is not particularly limited as long as it is a compound having a carboxyl group (—COOH).

Examples of the carboxylic acid include formic acid, and a compound in which a carboxy group is bonded to a hydrocarbon group.

The carboxylic acid is preferably a compound in which a carboxy group is bonded to a hydrocarbon group because this leads to a more excellent effect of the technology.

The hydrocarbon group that can be bonded to a carboxy group is not particularly limited. Examples thereof include aliphatic hydrocarbon groups (including linear, branched, and cyclic, ones), aromatic hydrocarbon groups, and combinations thereof.

Examples of the acid include: an aliphatic hydrocarbon compound having a carboxy group (excluding an aliphatic hydrocarbon compound having a carboxy group and a nitrile group, which is described below), such as acetic acid; and an aliphatic hydrocarbon compound having a carboxy group and a nitrile group, such as cyanoacetic acid.

The carboxylic acid is preferably an aliphatic hydrocarbon compound having a carboxy group and a nitrile group, and more preferably cyanoacetic acid.

One method of preparing the blocked amine catalyst is, for instance, a method in which the amine catalyst represented by Formula (1) and the acid are used in such amounts that all nitrogen atoms that the amine catalyst represented by Formula (1) has can be blocked with the acid, and mixed while being cooled.

(Combination of the Organic Tin Catalyst and the Specific Amine Catalyst)

For the combination of the organic tin catalyst and the specific amine catalyst, preferred is the combination of a dialkyltin bis(thioglycollate) and the specific amine catalyst, more preferred is the combination of a dialkyltin bis(thioglycollate) and an amine catalyst represented by Formula (1) where $R_1$ to $R_4$ each independently represent a monovalent group, or a blocked amine catalyst thereof, and still more preferred is the combination of a dialkyltin bis(thioglycollate) and a blocked amine catalyst of an amine catalyst represented by Formula (1) where $R_1$ to $R_4$ each independently represent a monovalent group, because this leads to a more excellent effect of the technology.

The urethanization reaction catalyst content (the total content of the organic tin catalyst and the specific amine catalyst) is preferably 0.001 to 1.0 mass % of the total amount of the curing agent because this leads to a more excellent effect of the technology.

In the urethanization reaction catalyst, the mass ratio between the organic tin catalyst and the specific amine catalyst is preferably specified such that the specific amine catalyst is contained in an amount of 1 to 100 parts by mass with respect to 1 part by mass of the organic tin catalyst because this leads to a more excellent effect of the technology.

<Filler>

In the present technology, the curing agent contains a filler. The filler contained in the curing agent is not particularly limited.

In the present technology, the filler contained in the curing agent does not include zeolite to be described later.

Examples of the filler contained in the curing agent include carbon black, calcium carbonate, clay, silica, and talc. The filler may be surface-treated with a surface treating agent such as a fatty acid, a resin acid, a urethane compound, and a fatty acid ester.

The filler contained in the curing agent is preferably calcium carbonate and/or clay because this leads to a more excellent effect of the technology.

The calcium carbonate is not particularly limited. For instance, conventionally known ones are usable.

The clay is not particularly limited. For instance, conventionally known ones are usable. The clay is preferably clay having undergone calcination (calcined clay) because this leads to a more excellent effect of the technology.

Filler Content of the Curing Agent

The filler content of the curing agent is preferably 10 to 60% and more preferably 25 to 45 mass % of the total amount of the curing agent because this leads to a more excellent effect of the technology.

<Zeolite>

In the present technology, the curing agent contains zeolite.

In the present technology, the use of zeolite enables absorption of water in the system whereby a reaction between isocyanate groups that the urethane prepolymer and the like have and water can be minimized in the initial stage of mixing of the two liquids.

Zeolite is a collective term of crystalline aluminosilicates.

The molar ratio of $SiO_2/Al_2O_3$ of zeolite is not particularly limited. The molar ratio of $SiO_2/Al_2O_3$ of zeolite can be measured by X-ray fluorescence spectrometry (XRF).

Exemplary skeleton structures of zeolite include A type, X type, LSX type, beta type, ZSM-5 type, ferrierite type, mordenite type, L type, and Y type.

The skeleton structure of zeolite is preferably the A type because this leads to a more excellent effect of the technology.

In zeolite, a cation is present in the skeleton to compensate negative charge. Exemplary cations include hydrogen ion; ammonium ion; alkali metal ions such as lithium ion, sodium ion, and potassium ion; and alkaline earth metal ions such as calcium ion.

The particle size of zeolite is preferably not more than 0.150 mm because this leads to a more excellent effect of the technology.

Zeolite Content

The zeolite content is preferably not less than 3 mass % and more preferably 4 to 10 mass % of the total amount of the curing agent because this leads to a more excellent effect of the technology.

Preparation of the Curing Agent

The curing agent can be prepared by, for example, mixing the foregoing essential components and optionally usable components, such as a polyamine.

(Other Components)

The urethane adhesive composition of the technology may optionally further contain additives as long as the object of the technology is not impaired. Examples of such additives include polyols other than the polyoxyalkylene polyol and the polyol 2, catalysts other than the organic tin catalyst and the specific amine catalyst, silane coupling agents, adhesion promoters, antisagging agents, antiaging agents, antioxidants, pigments (dyes), thixotropic agents, ultraviolet absorbers, flame retardants, surfactants, dispersants, dehydrating agents other than zeolite, and antistatic agents. The amounts of additives can be suitably determined. Each additive as above can be added to the main agent and/or the curing agent.

(Usage)

Since the composition of the technology is the two-part type having the main agent and the curing agent, it suffices if the main agent and the curing agent are mixed when used.

The ratio of the number of isocyanate reactive groups in the curing agent to the number of all isocyanate groups in the main agent (the molar ratio of isocyanate reactive groups in the curing agent/all isocyanate groups in the main agent) is preferably 0.6 to 1.0 because this leads to a more excellent effect of the technology.

When the main agent and the curing agent are mixed, the volume ratio between the main agent and the curing agent is not particularly limited; for instance, the main agent and the curing agent can be mixed in a volume ratio of 1:1.

Exemplary bases to which the composition of the technology can be applied include plastics, glasses, rubbers, and metals (including a painted board and an electrodeposited steel sheet).

Examples of plastics include polymers of propylene, ethylene, and cycloolefin monomer. The polymers may be each a homopolymer, a copolymer, or a hydrogenated product.

Specific examples of plastics include olefin resins such as polypropylene and polyethylene, polyester resins such as polyethylene terephthalate (PET) and polybutylene terephthalate (PBT), and hard-to-adhere resins such as polymethyl methacrylate resin (PMMA resin), polycarbonate resin, polystyrene resin, acrylonitrile-styrene copolymer resin, polyvinyl chloride resin, acetate resin, ABS resin (acrylonitrile butadiene styrene resin), and polyamide resin.

A base may be surface-treated. Exemplary surface treatments include flame treatment, corona treatment, ITRO treatment, and primer treatment. These treatments are not particularly limited. For instance, conventionally known ones are usable.

The method of applying the composition of the technology to a base is not particularly limited. For instance, conventionally known ones are usable.

Curing Conditions

The composition of the technology can be cured through mixing of the main agent and the curing agent.

After the main agent and the curing agent are mixed as above, the resulting mixture may be allowed to rest. The conditions for resting are, for instance, a relative humidity of 20% RH to 80% RH and a temperature of 5° C. to 45° C.

Elastic Modulus After Full Curing

The elastic modulus after the composition of the technology is fully cured is preferably not less than 15 MPa and more preferably 20 to 300 MPa because this leads to a more excellent effect of the technology.

In the present technology, it is assumed that the composition of the technology is fully cured by placing the composition of the technology under the conditions of 23° C. and 50% RH for 7 days.

The elastic modulus of a cured product obtained by fully curing the composition of the technology as described above is a tensile elastic modulus (unit: MPa) measured by carrying out a tensile test (pulling rate: 200 mm/min) according to JIS K 6850:1999 under the condition of 23° C.

EXAMPLES

The present technology is described below more specifically by way of examples. However, the present technology should not be construed as being limited to the following examples.

<Preparation of Urethane Prepolymer>

A polyol 1-1, a polyol 1-2, a polyisocyanate A-1, a polyisocyanate A-2, and a plasticizer shown in Table 1 below were used to have each composition (parts by mass) shown in the same table.

In preparation of urethane prepolymers with Formulations 1 to 4 shown in Table 1, the molar ratio of isocyanate groups that the polyisocyanate A-1 or the polyisocyanate A-2 had to the sum of hydroxy groups that the polyol 1-1 and the polyol 1-2 had (NCO groups/OH groups) was as follows.

NCO groups/OH groups in preparation of a urethane prepolymer with Formulation 1: 2.0
NCO groups/OH groups in preparation of a urethane prepolymer with Formulation 2: 2.0
NCO groups/OH groups in preparation of a urethane prepolymer with Formulation 3: 13.3
NCO groups/OH groups in preparation of a urethane prepolymer with Formulation 4: 19.9

A mixture of the foregoing components was reacted under the condition of 80° C. for 5 hours to prepare each urethane prepolymer.

For the urethane prepolymers prepared as above, the urethane prepolymer with Formulation 1 may contain a urethane prepolymer having an isocyanate group and an unreacted polyisocyanate A-1. The same applies to the urethane prepolymer with Formulation 2.

On the other hand, the urethane prepolymer with Formulation 3 contains a urethane prepolymer having an isocyanate group and an unreacted polyisocyanate A-2. The same applies to the urethane prepolymer with Formulation 4.

«Manufacture of Composition»

<Main Agent>

With each of the urethane prepolymers prepared as above, the other components (polyisocyanate B, filler 1) shown in Table 1 were used to have the relevant composition (parts by mass) shown in the same table, and all the components were mixed with a stirrer to manufacture a main agent.

(Calculation of the Isocyanate Group Content Based on the Total Amount of the Main Agent)

The isocyanate group content based on the total amount of each main agent was calculated as described below. The results are shown in Table 1.

When the isocyanate component was the urethane prepolymer (urethane prepolymers prepared in Formulations 3 and 4 in Table 1), the isocyanate group content based on the total amount of the main agent was calculated by the NCO amount calculation method I described above.

For Formulation 3, the isocyanate group content percentage (mass %) of the isocyanate component (the mixture of the urethane prepolymer and the plasticizer) as measured with a potentiometric titrator by the A method according to JIS K-1603-1:2007 was 10.8 mass %.

For Formulation 4, the isocyanate group content percentage (mass %) of the isocyanate component (the mixture of the urethane prepolymer and the plasticizer) as measured with a potentiometric titrator by the A method according to JIS K-1603-1:2007 was 17.3 mass %.

When the isocyanate component comprises the urethane prepolymer and the polyisocyanate B (Formulations 1 and 2 in Table 1), the isocyanate group content based on the total amount of the main agent is calculated by the NCO amount calculation method II described above.

For Formulation 1, the isocyanate group content percentage (mass %) of the isocyanate component (the mixture of the urethane prepolymer, the polyisocyanate B, and the plasticizer) as measured with a potentiometric titrator by the A method according to JIS K-1603-1:2007 was 10.8 mass %.

For Formulation 2, the isocyanate group content percentage (mass %) of the isocyanate component (the mixture of the urethane prepolymer, the polyisocyanate B, and the plasticizer) as measured with a potentiometric titrator by the A method according to JIS K-1603-1:2007 was 10.8 mass %.

TABLE 1

| 1st table (main agent) | | Formulation | | | |
|---|---|---|---|---|---|
| | | 1 | 2 | 3 | 4 |
| Polyol 1-1 | EXCENOL5030 | 100.0 | 50.0 | 100.0 | 100.0 |
| Polyol 1-2 | EXCENOL2020 | 0.0 | 50.0 | 0.0 | 0.0 |
| Polyisocyanate A-1 | MILLIONATE MT | 14.7 | 19.8 | 0.0 | 0.0 |
| Polyisocyanate A-2 | CORONATE MX | 0.0 | 0.0 | 112.4 | 168.8 |
| Polyisocyanate B | CORONATE MX | 94.0 | 94.1 | 0.0 | 0.0 |

TABLE 1-continued

| 1st table (main agent) | | Formulation | | | |
|---|---|---|---|---|---|
| | | 1 | 2 | 3 | 4 |
| Plasticizer | DINP | 67.4 | 70.9 | 67.5 | 0.0 |
| Filler 1 | Niteron #300 | 69.0 | 71.1 | 70.0 | 67.2 |
| Isocyanate group content based on total amount of main agent (mass %) | | 8.7 | 8.7 | 8.7 | 13.8 |

Details of the components shown in Table 1 are as follows.

(Polyol 1)

Polyol 1-1: Polyoxypropylene triol having three hydroxy groups per molecule and having a number-average molecular weight of 5000; EXCENOL 5030 manufactured by AGC Inc.

Polyol 1-2: Polyoxypropylene diol having two hydroxy groups per molecule and having a number-average molecular weight of 2000; EXCENOL 2020 manufactured by AGC Inc.

(Polyisocyanate A)

Polyisocyanate A-1: 4,4'-Diphenylmethane diisocyanate (pure MDI); MILLIONATE MT manufactured by Tosoh Corporation; molecular weight: 250.

Polyisocyanate A-2: Carbodiimide modification of MDI; CORONATE MX manufactured by Tosoh Corporation; having two isocyanate groups per molecule (for CORONATE MX, hereinafter the same).

Polyisocyanate B: Carbodiimide modification of MDI; CORONATE MX manufactured by Tosoh Corporation.

Plasticizer: DINP (diisononyl phthalate)

Filler 1: Carbon black; Niteron #300 manufactured by NIPPON STEEL Carbon Co., Ltd.

<Curing Agent>

The components shown in Table 2 below were used to have each composition (parts by mass) shown in the same table and mixed with a stirrer to manufacture a curing agent.

TABLE 2

| 2nd table (curing agent) | | Formulation | | | | |
|---|---|---|---|---|---|---|
| | | 1 | 2 | 3 | 4 | 5 |
| Polyoxyalkylene polyol (high molecular weight) | PREMINOL7001K | 100.0 | 100.0 | 100.0 | 100.0 | 100.0 |
| Polyol 2 (low molecular weight) | 1,4-Butanediol | 10.3 | 10.3 | 10.3 | 10.3 | 10.3 |
| Polyamine | JEFFAMINE D-400 | 2.3 | 2.3 | 2.3 | 2.3 | 2.3 |
| Filler 2 | NANOX 30 | | | | 89.6 | |
| Filler 3 | ST-BCK | 89.6 | 89.6 | 89.6 | | 89.6 |
| Zeolite | Zeolum A-4 | 10.7 | 10.7 | 10.7 | 10.7 | 10.7 |
| Organic tin catalyst 1 | U-860 | 0.043 | 0.043 | 0.043 | 0.043 | |
| Organic tin catalyst 2 | U-810 | | | | | 0.043 |
| Comparative amine catalyst 1 | DABCO 33LV | | | | | |
| Specific amine catalyst 1 | DMDEE | 0.427 | | | 0.427 | 0.427 |
| Specific amine catalyst 2 | TOYOCAT ET | | 0.427 | | | |
| Specific amine catalyst 3 | TOYOCAT ETF | | | 0.427 | | |
| Specific amine catalyst 4 | TOYOCAT ET + cyanoacetic acid | | | | | |
| Comparative amine catalyst 2 | U-CAT SA-1 | | | | | |
| Comparative amine catalyst 3 | TOYOCAT RX5 | | | | | |
| Amount (parts by mass) of zeolite with respect to 1 part by mass of organic tin catalyst 1 | | 248.8 | 248.8 | 248.8 | 248.8 | 248.8 |

| 2nd table (curing agent) (continuation) | | Formulation | | | | |
|---|---|---|---|---|---|---|
| | | 6 | 7 | 8 | 9 | 10 |
| Polyoxyalkylene polyol (high molecular weight) | PREMINOL7001K | 100.0 | 100.0 | 100.0 | 100.0 | 100.0 |
| Polyol 2 (low molecular weight) | 1,4-Butanediol | 10.3 | 10.2 | 10.3 | 10.3 | 19.3 |
| Polyamine | JEFFAMINE D-400 | | | 2.3 | | 2.2 |
| Filler 2 | NANOX 30 | | | | | |
| Filler 3 | ST-BCK | 87.5 | 89.2 | 89.6 | 97.9 | 88.7 |
| Zeolite | Zeolum A-4 | 10.4 | 10.5 | 10.7 | | 11.1 |
| Organic tin catalyst 1 | U-860 | 0.042 | | 0.043 | 0.042 | 0.011 |
| Organic tin catalyst 2 | U-810 | | | | | |
| Comparative amine catalyst 1 | DABCO 33LV | | 0.314 | | | |
| Specific amine catalyst 1 | DMDEE | | 0.209 | | | |
| Specific amine catalyst 2 | TOYOCAT ET | | | | | 0.444 |
| Specific amine catalyst 3 | TOYOCAT ETF | | | | | |
| Specific amine catalyst 4 | TOYOCAT ET + cyanoacetic acid | | | | | |

TABLE 2-continued

| | | | | | | |
|---|---|---|---|---|---|---|
| Comparative amine catalyst 2 | U-CAT SA-1 | | | 0.427 | | |
| Comparative amine catalyst 3 | TOYOCAT RX5 | | | | | |
| Amount (parts by mass) of zeolite with respect to 1 part by mass of organic tin catalyst 1 | | 247.6 | — | 248.8 | — | 1009.1 |

| | | Formulation | | | | |
|---|---|---|---|---|---|---|
| 2nd table (curing agent) (continuation) | | 11 | 12 | 13 | 14 | 15 |
| Polyoxyalkylene polyol (high molecular weight) | PREMINOL7001K | 100.0 | 100.0 | 100.0 | 100.0 | 100.0 |
| Polyol 2 (low molecular weight) | 1,4-Butanediol | 20.5 | 10.3 | 10.3 | 10.3 | 10.3 |
| Polyamine | JEFFAMINE D-400 | | 2.3 | 2.3 | 2.3 | 2.3 |
| Filler 2 | NANOX 30 | | | | | |
| Filler 3 | ST-BCK | 96.2 | 89.6 | 89.6 | 89.6 | 89.6 |
| Zeolite | Zeolum A-4 | 11.5 | 10.7 | 10.7 | 6.4 | 21.4 |
| Organic tin catalyst 1 | U-860 | | 0.043 | 0.043 | 0.043 | 0.043 |
| Organic tin catalyst 2 | U-810 | | | | | |
| Comparative amine catalyst 1 | DABCO 33LV | 0.481 | | | | |
| Specific amine catalyst 1 | DMDEE | 0.458 | | | | |
| Specific amine catalyst 2 | TOYOCAT ET | | | | 0.427 | 0.427 |
| Specific amine catalyst 3 | TOYOCAT ETF | | | | | |
| Specific amine catalyst 4 | TOYOCAT ET + cyanoacetic acid | | | 0.427 | | |
| Comparative amine catalyst 2 | U-CAT SA-1 | | | | | |
| Comparative amine catalyst 3 | TOYOCAT RX5 | | 0.427 | | | |
| Amount (parts by mass) of zeolite with respect to 1 part by mass of organic tin catalyst 1 | | — | 248.8 | 248.8 | 149.3 | 497.7 |

Details of the components shown in Table 2 are as follows.
(Polyoxyalkylene Polyol)
Polyoxyalkylene polyol (high molecular weight):
Polyoxyalkylene triol having three hydroxy groups per molecule, having a number-average molecular weight of 6000, and having an end to which ethylene oxide is added; PREMINOL 7001K manufactured by AGC Inc.
(Polyol 2)
Polyol 2 (low molecular weight): 1,4-Butanediol; manufactured by Mitsubishi Chemical Corporation.
Polyamine: Polyoxypropylene-α,ω-diamine; JEFFAMINE D-400 manufactured by Huntsman.
Filler 2: Calcium carbonate; NANOX 30 manufactured by Maruo Calcium Co., Ltd.
Filler 3: Clay; ST-BCK manufactured by Agrochemitech; calcined clay.
Zeolite: A-type zeolite; "Zeolum A-4" manufactured by Tosoh Corporation; molar ratio of $SiO_2/Al_2O_3=2$ to 2.5; powder; size: 0.15 mm or less (with 100 mesh).
(Organic Tin Catalyst)
Organic tin catalyst 1: Dioctyltin bis(octyl thioglycollate) (with the structure below); NEOSTANN U-860 manufactured by Nitto Kasei Co., Ltd.

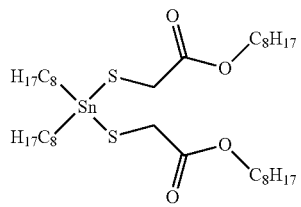

Organic tin catalyst 2: Dioctyltin dilaurate; NEOSTANN U-810 manufactured by Nitto Kasei Co., Ltd.
Comparative amine catalyst 1: 1,4-Diazabicyclo[2.2.2]octane (with the structure below); DABCO 33LV manufactured by Air Products Inc.

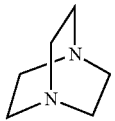

(Specific Amine Catalyst)
Specific amine catalyst 1: DMDEE; dimorpholinodiethyl ether (manufactured by San-Apro Ltd.); with the structure below.

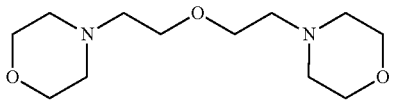 [SMILES: C1CN(CCOCCN2CCOCC2)CCO1]

Specific amine catalyst 2: Bis(N,N-dimethyl-2-aminoethyl)ether (with the structure below); TOYOCAT ET manufactured by Tosoh Corporation.

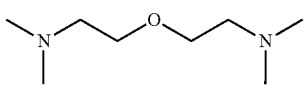

Specific amine catalyst 3: A blocked amine catalyst in which TOYOCAT ET is blocked with an acid; TOYOCAT ETF manufactured by Tosoh Corporation. In the specific amine catalyst 3, the acid used for blocking is a formic acid.
Specific amine catalyst 4: A blocked amine catalyst in which TOYOCAT ET is blocked with a cyanoacetic acid serving as the acid in a molar ratio of TOYOCAT ET:acid of 1:2; manufactured by mixing TOYOCAT ET and a cyanoacetic acid in a molar ratio of TOYOCAT ET:cyanoacetic acid of 1:2 while cooling them in a water bath at 10° C.

Comparative amine catalyst 2: A catalyst in which diazabicycloundecene is blocked with a phenol (with the structure below); NEOSTANN U-CAT SA-1 manufactured by Nitto Kasei Co., Ltd.

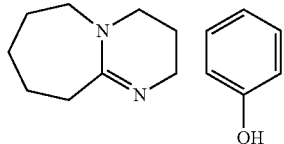

Comparative amine catalyst 3: N,N,N'-Trimethylaminoethylethanolamine (with the structure below); TOYOCAT RX5 manufactured by Tosoh Corporation.

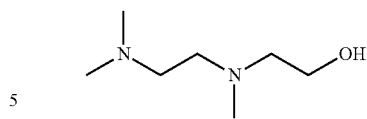

<Two-Part Urethane Adhesive Composition>

The main agents and the curing agents prepared as above were combined in combinations of the formulation numbers as shown in the third table to prepare two-part urethane adhesive compositions.

For each of the urethane adhesive compositions, the agents were stirred and mixed under the conditions of 23° C. and 50% RH. The ratio of the number of isocyanate reactive groups in the curing agent to the number of isocyanate groups in the main agent (isocyanate reactive groups/isocyanate groups) in this process is shown in the third table.

TABLE 3

| 3rd table (urethane adhesive composition) | | Example | | | | | |
|---|---|---|---|---|---|---|---|
| | | A | B | C | D | E | F |
| Main agent (formulation No.) | | 1 | 2 | 3 | 1 | 1 | 1 |
| Curing agent (formulation No.) | | 1 | 1 | 1 | 2 | 3 | 4 |
| Ratio of number of isocyanate reactive groups in curing agent to number of isocyanate groups in main agent (isocyanate reactive groups/isocyanate groups) | | 0.8 | 0.8 | 0.8 | 0.8 | 0.8 | 0.8 |
| Presence or absence of foaming (evaluation criteria for foaming minimizing performance) | | Excellent | Excellent | Excellent | Excellent | Good | Excellent |
| Evaluation of adhesion development performance | Shear strength development rate after one day | Good | Good | Good | Excellent | Excellent | Good |
| | Shear failure mode after one day | Good | Good | Good | Good | Good | Good |
| Elastic modulus after full curing (MPa) | | 35 | 35 | 35 | 35 | 35 | 30 |

| 3rd table (urethane adhesive composition) | | Example | | | | |
|---|---|---|---|---|---|---|
| | | G | H | I | J | K |
| Main agent (formulation No.) | | 1 | 4 | 1 | 2 | 2 |
| Curing agent (formulation No.) | | 5 | 10 | 13 | 14 | 15 |
| Ratio of number of isocyanate reactive groups in curing agent to number of isocyanate groups in main agent (isocyanate reactive groups/isocyanate groups) | | 0.8 | 0.8 | 0.8 | 0.8 | 0.8 |
| Presence or absence of foaming (evaluation criteria for foaming minimizing performance) | | Excellent | Excellent | Excellent | Good | Excellent |
| Evaluation of adhesion development performance | Shear strength development rate after one day | Good | Good | Excellent | Excellent | Good |
| | Shear failure mode after one day | Fair | Good | Good | Good | Fair |
| Elastic modulus after full curing (MPa) | | 35 | 200 | 35 | 35 | 40 |

| 3rd table (urethane adhesive composition) (continuation) | | Comparative Example | | | | | |
|---|---|---|---|---|---|---|---|
| | | a | b | c | d | e | f |
| Main agent (formulation No.) | | 1 | 1 | 1 | 1 | 4 | 1 |
| Curing agent (formulation No.) | | 6 | 7 | 8 | 9 | 11 | 12 |
| Ratio of number of isocyanate reactive groups in curing agent to number of isocyanate groups in main agent (isocyanate reactive groups/isocyanate groups) | | 0.8 | 0.8 | 0.8 | 0.8 | 0.8 | 0.8 |
| Presence or absence of foaming (evaluation criteria for foaming minimizing performance) | | Excellent | Excellent | Excellent | Poor | Excellent | Excellent |

TABLE 3-continued

| Evaluation of adhesion development performance | Shear strength development rate after one day | Poor | Poor | Poor | Poor | Poor | Poor |
|---|---|---|---|---|---|---|---|
| | Shear failure mode after one day | Good | Poor | Good | Poor | Poor | Good |
| Elastic modulus after full curing (MPa) | | 35 | 35 | 35 | 28 | 200 | 35 |

<Evaluation>

The urethane adhesive compositions thus mixed were evaluated as described below. The results thereof are shown in the third table.

(Production of Specimen)

Two adherends (width: 25 mm; length: 70 mm; thickness: 1.6 mm) formed from an electrodeposition coated sheet (the trade name of an electrodeposition coating paint: GT-10LF; manufactured by Kansai Paint Co., Ltd.) were prepared.

Next, each of the urethane adhesive compositions that had just prepared (mixed) was applied onto a surface of one of the two adherends to be 25 mm wide (to conform the width of the adherend) and 10 mm long (in the longitudinal direction of the adherend), whereafter the one adherend and the other adherend were adhered and press-bonded together to have a thickness of the applied urethane adhesive composition of 2 mm. Thus a specimen was prepared.

(Curing Condition)

Curing Condition 1

Each of the specimens produced as above was placed under the conditions of 23° C. and 50% RH for 24 hours to cure the relevant urethane adhesive composition.

Curing Condition 2 (Full Curing)

Each of the specimens produced as above was placed under the conditions of 23° C. and 50% RH for 7 days to cure the relevant urethane adhesive composition.

In the present technology, the curing conditions for full curing are defined as Curing condition 2 as above.

(Shear Test)

Each of the specimens produced as above was subjected to a tensile test (pulling rate: 50 mm/min) according to JIS K 6850:1999 under the condition of 23° C. to measure the shear adhesion strength, and the presence or absence of foaming in each of the specimens as well as the failure mode after the shear test were visually checked.

(Presence or Absence of Foaming: Evaluation Criteria for Foaming Minimizing Performance)

Each of cured products of the specimens produced as above was cut, and the cut surface of the cured product was visually observed and also magnified with a 50× magnifying glass and then observed.

When there was no foaming in the cut surface of the cured product in observation of the cut surface magnified with the magnifying glass, the foaming minimizing performance was rated as very excellent and denoted as "Excellent."

When foaming was seen in the cut surface of the cured product in observation of the cut surface magnified with the magnifying glass, the foaming minimizing performance was rated as fairly good and denoted as "Good."

When foaming was seen in the cut surface in visual observation without the need for magnification through the magnifying glass, the foaming minimizing performance was rated as poor and denoted as "Poor."

(Evaluation of Adhesion Development Performance)

In the present technology, the adhesion development performance was evaluated based on results of the shear strength development rate after one day (shear strength development rate) and the shear failure mode after one day, which are described below.

Shear Strength Development Rate After One Day (Shear Strength Development Rate)

Using the same type of the urethane adhesive composition, when the shear strength development rate after one day (the percentage of the shear adhesion strength of a specimen having been subjected to Curing condition 1 with respect to the shear adhesion strength of a specimen having been subjected to Curing condition 2) was 80% or more, this was denoted as "Excellent."

When the shear strength development rate after one day was 65% or more and less than 80%, this was denoted as "Good."

When the shear strength development rate after one day was less than 65%, this was denoted as "Poor."

Shear Failure Mode After One Day (CF Rate)

For the failure mode after the shear test of a specimen having been subjected to Curing condition 1, when the CF rate (the percentage of an area having cohesive failure (CF) with respect to the entire area of the adhesion surface) was 100%, this was denoted as "Good."

When the CF rate was 60% or more and less than 100%, this was denoted as "Fair."

When the CF rate was less than 60%, this was denoted as "Poor."

(Evaluation Criteria for Adhesion Development Performance)

In the present technology, when the shear strength development rate after one day (shear strength development rate) was 65% or more and the shear failure mode after one day (CF rate) was 60% or more, the adhesion development performance was rated as excellent.

In the foregoing case, the adhesion development performance was evaluated to be more excellent as the shear strength development rate was higher or the CF rate was higher. When evaluation results of the CF rate were the same for instance, a specimen with a higher shear strength development rate was evaluated to have more excellent adhesion development performance.

When the shear strength development rate was less than 65% or when the CR rate was less than 60%, the adhesion development performance was evaluated to be poor.

Elastic Modulus After Full Curing

Each of the specimens having been subjected to Curing condition 2 was subjected to a tensile test (pulling rate: 200 mm/min) according to JIS K 6850:1999 under the condition of 23° C. to measure a tensile elastic modulus (unit: MPa). The results thereof are shown in the "Elastic modulus after full curing" space in Table 3.

As the elastic modulus after full curing is higher, the adhesion strength after full curing is higher and thus favorable.

As evident from the results shown in Table 3, in Comparative Example a where no specific amine catalyst was used, the adhesion development performance (particularly the shear strength development rate) was poor.

In Comparative Example b where no organic tin catalyst was used and instead the comparative amine catalyst 1 was used, the adhesion development performance was poor.

In Comparative Example c where no specific amine catalyst was used and instead the comparative amine catalyst 2 was used, the adhesion development performance (particularly the shear strength development rate) was poor.

In Comparative Example d where neither zeolite nor specific amine catalyst was used, the foaming minimizing performance and the adhesion development performance were poor.

In Comparative Example e where no organic tin catalyst was used, the adhesion development performance was poor.

In Comparative Example f where no specific amine catalyst was used and instead the comparative amine catalyst 3 was used, the adhesion development performance (particularly the shear strength development rate) was poor.

In contrast, in each of the urethane adhesive compositions according to the technology, the main agent had a high isocyanate group content, and excellent adhesion strength was allowed to develop even when a dehydrating agent was used, while foaming in the cured product was able to be minimized.

The invention claimed is:

1. A urethane adhesive composition being a two-part urethane adhesive composition comprising a main agent and a curing agent,
   wherein the main agent contains a urethane prepolymer and a filler, the urethane prepolymer having an isocyanate group and being formed from a polyisocyanate A and a polyol 1 that has two to three hydroxy groups per molecule and has a number-average molecular weight of not less than 1800,
   a content of isocyanate groups in the main agent is not less than 5 mass % of a total amount of the main agent,
   the curing agent contains a polyoxyalkylene polyol, a polyol 2, a urethanization reaction catalyst, a filler, and zeolite, the polyoxyalkylene polyol having two to three hydroxy groups per molecule and having a number-average molecular weight of not less than 1800, the polyol 2 having two or more hydroxy groups per molecule and having a number-average molecular weight of not more than 200, and
   the urethanization reaction catalyst contains an organic tin catalyst, and an amine catalyst represented by Formula (1) or a blocked amine catalyst in which the amine catalyst is blocked with an acid,

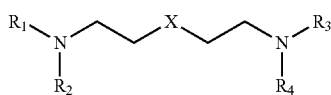

(1)

where X represents an oxygen atom, or a nitrogen atom to which one alkyl group is bonded, $R_1$ to $R_4$ each independently represent an alkyl group, the alkyl group may have an ether bond, $R_1$ and $R_2$ may be bonded together to form a cyclic structure, and $R_3$ and $R_4$ may be bonded together to form a cyclic structure, wherein number-average molecular weights are standard polystyrene equivalent values obtained by gel permeation chromatography measurement with a tetrahydrofuran solvent and an RI detector.

2. The urethane adhesive composition according to claim 1,
   wherein the main agent further contains a polyisocyanate B.

3. The urethane adhesive composition according to claim 2,
   wherein the polyisocyanate A and the polyisocyanate B each independently include at least one selected from the group consisting of diphenylmethane diisocyanate, polymeric MDI, and modified MDI.

4. The urethane adhesive composition according to claim 1,
   wherein the urethane prepolymer further contains unreacted polyisocyanate A.

5. The urethane adhesive composition according to claim 1,
   wherein in the organic tin catalyst, a ligand coordinated to a tin atom has a sulfur atom as a coordinating atom coordinated to the tin atom.

6. The urethane adhesive composition according to claim 1,
   wherein the polyol 1 includes at least a polyol having three hydroxy groups per molecule and having a number-average molecular weight of not less than 4800.

7. The urethane adhesive composition according to claim 1,
   wherein the polyoxyalkylene polyol has three hydroxy groups per molecule and has a number-average molecular weight of not less than 4,800.

8. The urethane adhesive composition according to claim 1,
   wherein the polyol 2 has two hydroxy groups per molecule.

9. The urethane adhesive composition according to claim 1,
   wherein the polyol 2 is 1,4-butanediol.

10. The urethane adhesive composition according to claim 1,
    wherein a content of the zeolite is not less than 3 mass % of a total amount of the curing agent.

11. The urethane adhesive composition according to claim 1,
    wherein a ratio of the number of isocyanate reactive groups in the curing agent to the number of all isocyanate groups in the main agent is 0.6 to 1.0.

12. The urethane adhesive composition according to claim 1,
    wherein a content of the urethanization reaction catalyst is 0.001 to 1.0 mass % of a total amount of the curing agent.

13. The urethane adhesive composition according to claim 1,
    wherein a tensile elastic modulus after full curing is not less than 15 MPa, as measured by a tensile test according to JIS K 6850:1999 at a pulling rate of 200 mm/min and a temperature of 23° C.

14. The urethane adhesive composition according to claim 1,
    wherein the curing agent further contains a polyamine.

* * * * *